United States Patent Office 2,702,239
Patented Feb. 15, 1955

2,702,239

PROCESS OF ARC MELTING ZIRCONIUM

Henry L. Gilbert, Corvallis, and Alfred D. Cavett and William E. Brennan II, Albany, Oreg.

No Drawing. Application May 27, 1952,
Serial No. 290,378

5 Claims. (Cl. 75—10)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to zirconium metallurgy and more particularly to processes in which metallic zirconium is employed in the fused or molten stage.

Still more particularly, this invention relates to the production of shaped objects of metallic zirconium such as, for example, ingots, castings, or the like.

Pure metallic zirconium possesses unusual utility in the arts, wherein extreme resistance to heat is required, inasmuch as it has a melting point of about 1850° C.

It will be appreciated that one of the few practical means for fusing a metal of this high melting point is the electric arc. However, for many purposes, it is necessary that the metallic zirconium objects produced be of a very high purity. Unfortunately, molten zirconium metal is very easily contaminated by the oxides, silicates, carbonates, or similar chemicals employed to yield slags or fluxes in ordinary electric-arc welding. Another problem is that, when fusing in the electric arc metallic zirconium of high purity, the zirconium electrode yields an unstable arc which is erratic and spatters the molten metal without the desired quiet fusion. While the exact reason for the spattering can only be surmised, it is believed that, on the basis of evidence now at hand, metallic zirconium possesses such a low vapor pressure at the temperature of the electric arc that the pure metal alone does not permit the formation of a quiet arc.

It is an object of this invention to overcome the foregoing disadvantages and to produce shaped objects of substantially pure metallic zirconium by fusing the same in an electric arc which has been stabilized.

Another object is to carry out the fusion of substantially pure metallic zirconium under conditions of steady current flow without substantial contamination of the fused zirconium metal produced.

Other objects and advantages will be apparent or will appear hereinafter as the ensuing description proceeds.

These objects are accomplished in accordance with this invention wherein metallic zirconium is fused in an electric arc surrounded by a nonreactive gaseous atmosphere by vaporizing in such an electric arc a small amount of a conductive metal sufficient to inhibit spattering of zirconium but insufficient substantially to contaminate the produced casting.

The selected vaporizable metal must be one which is substantially completely volatilized at the temperature of the electric arc so as not to contaminate the produced zirconium metal casting, but must be present in an amount sufficient to yield a quiet and continuous electric arc. To this end, it has been found that between 0.02 and 1.0 percent by weight of vaporizable metal, selected from the group consisting of alkaline earth metals and lithium, provides a steady, quiet, efficient electric arc while, at the same time, does not contaminate the fused metallic zirconium—that is to say, the purity of the object produced remains unimpaired. Metallic magnesium constitutes a preferred metal meeting the foregoing requirements, inasmuch as it is completely volatilized at the temperature of the electric arc, is highly conductive, and may be readily incorporated in the compacted zirconium electrodes consumed in the process of making castings. While magnesium is a preferred metal for stabilizing the arc calcium, barium and strontium may similarly be employed in many applications. Lithium metal, while not a member of the preferred alkaline earth group, also has utility in the process. Likewise, mixtures of the foregoing metals may be employed so long as the other process requirements stated are met.

The electric arc employed to fuse the high purity zirconium metal is generally operated at a voltage between 15 and 40 volts, employing the arc stabilization of this invention. Under these conditions, a current flow of from 800 to 1800 amperes steadily passes between the electrodes depending upon the size thereof.

Under the high temperature conditions of the electric arc, it is necessary to blanket or surround the arc and resulting molten metal with a nonreacting gas. Suitable examples of nonreacting gases for employment in this invention include hydrogen, helium and argon, of which gaseous argon is preferred inasmuch as it apparently ionizes in the arc and aids in the passage of the electric current, thus serving a dual function in the process.

Various means may be employed to feed the metallic magnesium or other vaporizable metal into the electric arc. For example, the operator may feed metallic magnesium dust into the zirconium arc. However, as a practical matter, distinct advantages result in convenience, safety and economy, as well as precise control, by incorporating from 0.02 to 1.0 percent by weight of metallic magnesium or other selected metal, with the metallic zirconium prepared for use as an electrode. Generally, the magnesium metal can be incorporated by combining the selected proportion thereof with zirconium metal in the form of powder or scales, inclosing the mixture in an iron sheath as, for example, a plugged or capped section of steel pipe, and forging the sheathed mixture of zirconium and magnesium, or the like, at a temperature of about 800° C., until the zirconium and contained magnesium become substantially homogeneous. Thereupon, the rolled bars are stripped of their iron sheath and threaded at the ends for use as electrodes in the melting furnace. The process of preparing electrodes containing magnesium or the like is more particularly described in application Serial No. 142,498, filed February 4, 1950, now abandoned, in the names of James R. Long and Earl T. Hayes, assigned to the same assignee as this application, and entitled "Sheathed Working of Metal Powders."

The following illustrative example shows how the invention may be carried out, but the invention is not to be restricted thereto:

An electric-arc furnace was employed provided with means for surrounding the electric arc and molten metal with a gaseous argon atmosphere. The electrodes employed were produced as above described and contained a small proportion of magnesium, as set forth in the following Table I:

*Table I*

| Bar No. | Mg content, percent |
|---|---|
| 1 | 0.02 |
| 2 | 0.05 |
| 3 | 0.13 |
| 4 | 0.26 |
| 5 | 0.45 |

The gaseous atmosphere of argon was turned on, an arc was struck between two of the zirconium-magnesium electrodes, and a voltage of 20 volts D. C. yielded a steady current flow of 1500 amperes. The electrodes fused quietly and the molten metal was captured in an ingot mold. The magnesium content of the electrodes employed and of the produced ingots is shown below:

Table II

| Bar No. | Mg content, percent | Ingot No. | Residual Mg, percent |
|---|---|---|---|
| 1 | 0.02 | 1 | ¹0.005 |
| 2 | 0.05 | 2 | ¹0.005 |
| 3 | 0.13 | 3 | 0.005 |
| 4 | 0.26 | 4 | 0.005 |
| 5 | 0.45 | 5 | 0.005 |

¹ Less than.

It was observed that the magnesium metal vaporized in the arc and condensed in a cooler portion of the furnace where it was recovered and available for re-utilization.

By way of comparison, a second group of high purity zirconium test bars containing an average of only 0.009 percent of magnesium yielded a violent spattering and erratic arc, even though the voltage was raised to 50 volts D. C. An erratic current flow of only 600 amperes was noted and no usable ingots were produced. When a small amount of magnesium dust was fed to the arc mechanically with the same low magnesium unsuccessful test bars, the electric arc operated successfully until the magnesium was dissipated.

It will be appreciated from the foregoing description that an economical and feasible process has been provided for the production of ingots, castings and other shaped objects of metallic zirconium of a very high purity. Other high melting metals of low vapor pressure such as, for example, hafnium, tantalum, molybdenum and columbium, may similarly be fused in a stabilized arc in accordance with this invention.

The advantages of this invention are particularly useful in the production of shaped objects of substantially pure zirconium. Obviously, when an alloy containing many other metals besides zirconium is fused, and where the purity of the finished object is not important, then the problems which this invention overcomes might not exist.

Since many apparently differing embodiments of this invention will occur to one skilled in the art, in the light of the foregoing description, it is not desired to limit the invention to the precise embodiments shown and described.

What is claimed is:

1. The process of arc melting substantially pure zirconium metal while maintaining a stable arc to form a sound dense ingot of substantially pure zirconium, which comprises passing the arc at a low voltage of about 20 volts direct current in an inert atmosphere between two electrodes at least one of which is a consumable electrode made of the substantially pure zirconium metal and containing also between about 0.02 and 1.0 percent by weight of a volatilizable metal of higher vapor pressure than the pure zirconium metal and selected from the class consisting of alkaline earth metals and lithium whereby vapors of the last mentioned metal are formed in sufficient quantity to be electrically conductive at the arc conditions and stabilize the arc to effect quiet melting of the zirconium and produce a zirconium ingot substantially free of the last mentioned metal.

2. The process of claim 1, wherein the vaporizable metal component is magnesium.

3. The process of claim 1, wherein the vaporizable metal component is barium.

4. The process of claim 1, wherein the vaporizable metal component is calcium.

5. The process of claim 1, wherein the vaporizable metal component is strontium.

References Cited in the file of this patent

UNITED STATES PATENTS

| | | |
|---|---|---|
| 2,303,973 | Armstrong | Dec. 1, 1942 |
| 2,541,764 | Herres et al. | Feb. 13, 1951 |
| 2,564,337 | Maddex | Aug. 14, 1951 |

OTHER REFERENCES

Metal Progress, page 190, February 1949.